(12) United States Patent
Ebner et al.

(10) Patent No.: US 6,821,574 B2
(45) Date of Patent: Nov. 23, 2004

(54) METHOD OF MANUFACTURING A MAGNETIC RECORDING MEDIUM

(75) Inventors: Stephen R. Ebner, Stillwater, MN (US); Guy Tadlock, Auburn, AL (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/367,401

(22) Filed: Feb. 14, 2003

(65) Prior Publication Data

US 2004/0161637 A1 Aug. 19, 2004

(51) Int. Cl.⁷ .................................................. B05D 5/12
(52) U.S. Cl. ....................... 427/548; 427/128; 427/130; 427/131; 427/385.5; 427/599
(58) Field of Search .................. 427/548, 128, 427/130, 131, 385.5, 599

(56) References Cited

U.S. PATENT DOCUMENTS 6,086,674 A   7/2000   Nagler et al.
6,261,647 B1  7/2001   Komatsu et al.

FOREIGN PATENT DOCUMENTS

EP   0 782 132 B1   9/2002

*Primary Examiner*—Bernard Pianalto
(74) *Attorney, Agent, or Firm*—Eric D. Levinson

(57) ABSTRACT

A multiple layer magnetic recording medium exhibiting a marked increase in skirt signal-to-noise ratios, and a method of manufacturing such magnetic recording medium including the steps of forming a lower support layer and a magnetic layer on the substrate; transporting the magnetic recording medium on a non-magnetic carrier in a transport direction; exposing the magnetic recording medium to a first magnetic field of up to about 2500 gauss when the average percent solids of the multiple layers is less than 40% collectively, and exposing the magnetic recording medium to at least one additional magnetic field of from about 3500 to about 7000 gauss as the magnetic recording medium continues to transport when the average percent solids of said multiple layers is from about 43% to about 60% collectively, wherein the magnetic pigment particles in said magnetic layer are oriented in a longitudinal direction.

10 Claims, No Drawings

METHOD OF MANUFACTURING A MAGNETIC RECORDING MEDIUM

THE FIELD OF THE INVENTION

The present invention generally relates to a method of manufacture for a magnetic recording media layer, and an apparatus therefor, specifically a method for orienting magnetic pigment particles contained in a magnetic recording layer for optimum signal to noise ratio.

BACKGROUND OF THE INVENTION

Formulations to be coated onto substrates for use as magnetic recording layers or lower support layers are required to be extremely thin coatings. Such formulations are typically magnetic or other pigment particles dispersed in binder systems with various adjuvants, which are custom and proprietary to magnetic recording manufacturers, and which vary with the type and variation of magnetic media produced. Many, if not most, coating formulations are coated onto plastic substrates of one type or another.

Conventionally, manufacture of magnetic recording media has included the process of orienting magnetic particles in the magnetic layer(s) in order to improve the recording density. Various processes for making recording media have oriented the magnetic pigment particles in a direction parallel to the surface of the magnetic layer and in the longitudinal direction of the magnetic recording medium; other processes have oriented in oblique and transverse directions. The recommended method orients the magnetic pigments into the preferred direction of the given medium format consistent with tracks and head designs.

After the magnetic layer has been formed upon the substrate, or upon a first non-magnetic layer coated on the substrate, the particles in the layer are typically oriented during the drying process. Placement of the magnets is an important issue in the orientation of the magnetic layer, especially with the very thin magnetic layers now preferred for increased recording density. When magnets are placed late in the drying process, the thinner layers have dried quickly because of the small amount of solvent present, and the subsequent orienting operations result in only minimal improvement to tape performance. However, attempts to place magnets earlier in the drying cycle have been unsuccessful. Early placement of magnets, at a point where the viscosity of the coating is still very low and the particles are still mobile, has typically caused the magnetic particles to clump and form long chains throughout the magnetic layer. This is highly detrimental to the recording density and quality of the resulting medium.

It has now been discovered that a magnetic recording medium exposed to a magnetic field e.g., up to about 2500 gauss created by permanent magnets or electric coils, at a point when the average percent solids of the multiple layers is less than 40% collectively, and exposing the magnetic recording medium to at least one additional magnetic field of from about 3500 to about 7000 gauss after partial drying when the average percent solids of said multiple layers is from about 43% to about 60% collectively exhibits significantly improved skirt signal-to-noise ratios over a magnetic recording medium only exposed to the higher strength magnetic field(s).

SUMMARY OF THE INVENTION

The invention provides a method for manufacturing a magnetic recording medium which includes the step of orienting the magnetic coating to provide magnetic squareness and orientation ratio.

Specifically, the invention provides a method of manufacturing a magnetic recording medium comprising the steps of:

a) forming at least one support layer selected from a non-magnetic or soft magnetic layer on a non-magnetic substrate;

b) forming at least one magnetic layer comprising magnetic pigment particles atop said at least one support layer to form a magnetic recording medium having multiple layers;

c) exposing said magnetic recording medium to a first magnetic field of up to about 2500 gauss when the average percent solids of said multiple layers is less than 40% collectively, and d) exposing said magnetic recording medium to at least one additional magnetic field of from about 3500 to about 7000 gauss when the average percent solids of said multiple layers is from about 43% to about 60% collectively, wherein said magnetic pigment particles in said magnetic layer are oriented in a longitudinal direction.

In another aspect of the invention, a magnetic recording medium is provided which exhibits a significant increase in skirt signal-to-noise ratio, such medium comprising a substrate having coated at least one magnetic layer comprising magnetic pigment particles, said magnetic pigment particles having been oriented longitudinally by means of exposure to a first magnetic field of up to about 2500 gauss when the multiple layers have an average percent solids of less than 40% collectively, and exposure to at least one additional magnetic field of from about 3500 to about 7000 gauss when the multiple layers have an average percent solids of from about 43% to about 60% collectively, wherein this magnetic recording medium exhibits at least a 0.5 decibel (dB) increase over an identical magnetic recording medium not exposed to said 2500 gauss magnetic field when said average percent solids of said multiple layers collectively is less than 40%.

In another aspect of the invention, a layer magnetic recording medium is provided which exhibits a significant increase in skirt signal-to-noise ratio, such medium comprising a substrate having coated thereon at least one support layer, and at least one magnetic layer comprising magnetic pigment particles, the magnetic pigment particles having been oriented longitudinally by means of exposure to a first magnetic field of up to about 2500 gauss when the multiple layers have an average percent solids of less than 40% collectively, and exposure to at least one magnetic field of from about 3500 to about 7000 gauss when the multiple layers have an average percent solids of from about 43% to about 60% collectively. This magnetic recording medium exhibits an increase in skirt signal-to-noise ratio of at least about 1 decibel over an identical magnetic recording medium not exposed to said 2500 gauss magnetic field when said average percent solids of said multiple layers collectively is less than 40%. As used herein, these terms have the following meanings:

1. The term "web" refers to a support for transporting the magnetic recording media through the manufacturing process.
2. The term "coercivity" means the intensity of the magnetic field needed to reduce the magnetization of a ferromagnetic material to zero after it has reached saturation.
3. The term "Oersted", abbreviated as Oe, refers to a unit of magnetic field in a dielectric material equal to $1/\mu$ Gauss, where $\mu$ is the magnetic permeability.
4. The terms "layer" and "coating" are used interchangeably to refer to a coated composition.

5. The term "skirt noise" means the noise in a measurement bandwidth of about 2 MHz centered about the signal frequency used, when tested according to ECMA International Standard 319.

6. The term "broadband signal-to-noise ratio", usually abbreviated "BBSN", is the ratio of average signal power to average integrated broad noise power of a tape clearly written at density TRD2, and is expressed in decibels (dB).

5. The term "calendering" refers to passing material through heated cylinders or rolls for such purposes as to render the thickness uniform, to increase surface gloss, or to force a top layer to impregnate a lower layer.

6. The term "in-line" means occurring in the same manufacturing line as the majority of the other processes for manufacture of the magnetic recording medium.

7. The term "average percent solids collectively" means the average of the percent solids of all of the multiple layers coated onto the front side of the magnetic recording medium, both support layers and magnetic layers.

All portions, percents and ratios herein are by weight unless otherwise specifically stated.

DETAILED DESCRIPTION OF THE PREFERRED EMBODIMENTS

The magnetic recording medium of the invention includes a non-magnetic substrate, a magnetic upper layer, a lower support layer, and a back coat layer. The various components are described in greater detail below. In general terms, however, the magnetic upper layer includes a primary magnetic metallic pigment powder, and a binder for the pigment. The lower support layer typically includes a primary powder material consisting of particles having a coercivity of 300 Oe or less and a conductive carbon black material dispersed in a binder system, but may also include additional magnetic particles.

The Layer Formulations

The upper layer of the medium is a magnetic recording layer. The magnetic recording layer is a thin layer, being from about 0.02 micron to about 0.3 micron, preferably from about 0.05 $\mu$ to about 0.25 $\mu$ in thickness, preferably from about 0.08 to about 0.2 $\mu$.

The magnetic metal particle comprises a primary magnetic metal particle in conjunction with a large, soft particle powder (i.e., having a Moh's hardness of less than 5 and average particle size of 50–500 nm, for example large particle carbon black), along with other additives such as an abrasive head cleaning agent (HCA). The primary magnetic metal particle is preferably a ferromagnetic powder including, for example, magnetic iron oxide (g-FeO$_x$) and Co-containing (coated, modified, or coated) g-FeO$_x$(x=1.33–1.50), ferromagnetic powder ($\alpha$-Fe, alloys of iron with Co or Ni), etc. In order to improve the required characteristics, the preferred ferromagnetic powder contains various additives, such as semi-metal or non-metal elements and their salts or oxides such as Al, Co, Y, Ca, Mg, Mn, Na, etc. The selected ferromagnetic powder may be treated with various auxiliary agents before it is dispersed in the binder system, resulting in the primary magnetic metal particle pigment. Such pigments are readily commercially available from companies such as Toda Kogyo Corporation, Dowa Mining Company, and Kanto Denka Kogyo Company.

In addition to the preferred primary magnetic metal particle described above, the upper layer further includes carbon particles. A small amount, preferably less than 1%, of at least one large particle carbon material is also included, preferably a material that includes spherical carbon particles. The remainder of the carbon particles present in the upper layer are small carbon particles, i.e., the particles have a particle size on the order of less than 100 nm, preferably less than about 75 nm.

The magnetic upper layer also includes an abrasive or HCA component. One preferred HCA component is aluminum oxide. Other abrasive materials such as silica, $ZrO_2$, $Cr_2O_3$, etc., can also be employed, either alone or in mixtures with aluminum oxide or each other.

The binder system associated with the upper layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the upper layer includes a combination of a primary polyurethane resin and a vinyl chloride resin. Examples of polyurethanes include polyester-polyurethane, polyether-polyurethane, polycarbonate-polyurethane, polyester-polycarbonate-polyurethane, and polycaprolactone-polyurethane. Other acceptable vinyl chloride resins such as vinyl chloride-vinyl acetate copolymer, vinyl chloride-vinyl acetate-vinyl alcohol copolymer, and vinyl chloride-vinyl acetate-maleic anhydride can also be employed with the primary polyurethane binder. Resins such as bis-phenyl-A-epoxy, styrene-acrylonitrile, and nitrocellulose may also be acceptable.

The magnetic upper layer may further contain one or more lubricants such as a fatty acid and/or a fatty acid ester. The incorporated lubricant(s) exist throughout the front coating and, importantly, at the surface of the upper layer. The lubricant(s) reduces friction to maintain smooth contact with low drag, and protects the media surface from wear.

The binder system may also contain a hardening agent such as isocyanate or polyisocyante. In a preferred embodiment, the hardener component is incorporated into the upper layer in an amount of 2 to 5 parts by weight, and preferably 3 to 4 parts by weight, based on 100 parts by weight of the primary magnetic pigment. Useful solvents associated with the upper layer coating material preferably include cyclohexanone (CHO), with a preferred concentration of from about 5% to about 50%, methyl ethyl ketone (MEK), preferably having a concentration of from about 30% to about 90%, and toluene, having a concentration of from about 0% to about 40%.

The lower layer of a multi-layer magnetic tape is essentially non-magnetic and typically includes a non-magnetic or soft magnetic powder, and a resin binder system. By forming the lower layer to be essentially non-magnetic, the electromagnetic characteristics of the upper magnetic layer are not adversely affected. However, where it is advantageous, e.g., to improve servo performance, the lower layer may contain a magnetic powder. In fact, a magnetic lower layer could be used so long as the coercivities of the upper layer and the lower layer are substantially different.

The pigment or powder incorporated in the lower layer includes at least a primary pigment material and conductive carbon black. The primary pigment material consists of particles having a coercivity of less than 300 Oe. Non-magnetic particles such as iron oxides, titanium dioxide, titanium monoxide, alumina, tin oxide, titanium carbide, silicon carbide, silicon dioxide, silicon nitride, boron nitride, etc., or soft magnetic particles having a coercivity of less than 300 Oe, can be employed as lower layer pigments. Alternately, these primary pigment materials can be coated with an electroconductive material, such as carbon, to aid in dispersibility and improve the conductivity of the coating. In a preferred embodiment, the primary lower layer pigment material is a carbon-coated hematite material ($\alpha$-iron oxide), which can be acidic or basic in nature. The total amount of conductive carbon black and electroconductive coating material in the lower layer is preferably sufficient to provide a resistivity at or below $1 \times 10^8$ ohm/cm$^2$.

The binder system or resin associated with the lower layer preferably incorporates at least one binder resin, such as a thermoplastic resin, in conjunction with other resin components such as binders and surfactants. In one preferred embodiment, the binder system of the lower layer includes a combination of a primary polyurethane resin and a vinyl chloride resin similar to that discussed for the upper recording layer. The lower layer can further include hardeners, lubricants, HCAs and other adjuvants as discussed for the upper layer.

The substrate can be any conventional non-magnetic substrate useful as a magnetic recording medium support. Exemplary substrate materials useful for magnetic recording tapes include polyesters such as polyethylene terephthalate, polyethylene naphthalate (PEN), a mixture of polyethylene terephthalate and polyethylene naphthalate; polyolefins (e.g., polypropylene); cellulose derivatives; polyamides; and polyimides. In a preferred embodiment, poly(ethylene naphthalate) (PEN) or poly(ethylene terephthalate) is employed.

Manufacturing Method

The process for manufacture of the magnetic recording medium includes a formulation portion, a layer formation portion or coating portion, a drying and orienting portion and a calendering portion. Such "portions" of the manufacturing process are typically, but not always, carried out in a continuous fashion, with the partially finished product moving from station to station until the product manufacture is complete, or substantially complete.

The formulation portion of the manufacturing process begins by providing the raw ingredients, and making them into a finished formulation to be coated. This portion of the process must be done for each layer to be included in the magnetic recording medium, such as the magnetic layer, the support or lower layer, and the backcoat layer. The formulations for these layers may be mixed and kneaded concurrently or sequentially, as desired, depending on such factors as the apparatus, and the pot life of the ingredients. The formulation portion of the manufacturing processes includes at least a high-solids mixing step, one or more dispersion steps and one or more mixing steps, which may be arranged in various order, depending on the exact formulation to be used. Typically, the pigment particles are kneaded with the binder formulation for the formation of both the magnetic layer and the lower support layer. Conventional kneading equipment may be used to knead the particles with the binder. Additional materials such as carbon blacks, abrasives, antistatic agents, lubricants, solvents and the like may be added at any step, or at more than one step, if desired. For example, frequently the pigment particles are kneaded with only a portion of the binder, and the remainder of the binder is subsequently added.

In the layer formation portion of the manufacturing process, the layers are coated onto the substrate. This includes unwinding a non-magnetic substrate or other material from a spool or supply. When the front layers are to be coated, for the multi-layer magnetic recording media of the invention, the lower layer is coated first, directly onto the substrate, and the magnetic coating is then coated atop the lower layer. The magnetic layers are typically coated wet-on-wet, but may be coated onto a dry support layer, if desired.

If desired, a backcoat can also be applied to the substrate on the surface opposite the front coat. The multiple layer front coating can occur prior to the backcoating; however, more typically, the substrate is coated with the backcoating on one side of the substrate, and the backside coating is dried, typically using conventional ovens, prior to the coating of the front layers.

Coating methods such as extrusion coating, gravure coating, roll coating, knife coating or the like may be used for coating any or all of the layers to be coated onto the substrate.

After the magnetic layer has been coated, the substrate is transported from the coating station in a transport direction toward the drying station. According to the manufacturing method of the invention, the magnetic recording medium is exposed to a first magnetic field, created either by permanent magnet(s) or electrical coils, at a point along the transport path where the magnetic recording medium traveling on its carrier web with at least its frontside coating complete, will encounter the field when the viscosity of the coating dispersions is still low. Specifically, the magnetic recording medium is exposed to a first magnetic field when the average percent solids of all of the front coatings, collectively, is less than about 40%. Preferably, the magnetic recording medium is exposed to the first magnetic field at a point when the average percent solids of the coatings collectively is less than about 33%; more preferably when the average percent solids of the coatings is from about 33% to about 37%, when measured and averaged collectively.

The first magnetic field may be placed in a position prior to where the magnetic recording medium enters a drying oven, or interior to the oven itself. As the magnetic recording medium passes the magnet(s), the magnetic pigment particles in the upper magnetic layer of the medium are oriented in the transporting direction of the substrate, namely, the longitudinal direction.

The magnetic recording medium continues along the transport path and passes through at least one additional magnetic field of from about 3000 to about 7000 gauss. The medium is then partially dried before passing through a second magnetic field.

The second magnetic field is preferably applied to the magnetic recording medium at a point when the average percent solids of the front coatings, measured and averaged collectively, is less than about 60%. Preferably, the magnetic recording medium is exposed to the second magnetic field at a point when the average percent solids of the coatings collectively is at or less than about 60%; more preferably when the average percent solids of the coatings is from about 45% to about 50%, when measured collectively.

Surprisingly, the addition of the first magnetic field results in significantly improved skirt signal-to-noise ratio, SNRsk, when tested using the procedures of the Linear Tape Open Specification, which was promulgated by the European Computer Manufacturer's Association, and is designated as ECMA standard 319. This ECMA standard specifies the physical and magnetic characteristics of magnetic tape cartridges, using magnetic tape 12.65 mm wide so as to provide physical interchange of such cartridges between drives. It also specifies the quality of the recorded signals, the recording method and the recorded format, thereby allowing data interchange between drives by means of such cartridges. In Annex B of such standard, broadband signal-to-noise ratios are defined and procedures for measure set out. The broadband signal-to-noise ratio is measured, and when the measurements are plotted, a Gaussian type graph generally results. The noise that occurs in the area of the graph called the skirt is very important because it has been correlated to error rates in high performance data recording systems, especially those using PRML recording schemes such as Ultrium®. Magnetic recording media made using this "early extra magnet" process of the invention exhibit a dramatic increase in the skirt signal-to-noise ratio of at least about 0.5 dB, preferably at least about 1 dB.

After the coated substrate is dried and oriented, the now fully coated magnetic recording medium proceeds to one or more calendering stations, which may be in-line with the other processes or off-line. According to one embodiment, both in-line and off-line calendering are used, and the in-line calendering station uses one or more in-line nip stations, in each of which a steel or other generally non-compliant roll contacts or otherwise is applied to the magnetically coated side of the substrate, and a rubberized or other generally compliant roll contacts or otherwise is applied to the back-coated side. The generally non-compliant roll provides a desired degree of smoothness to the magnetically coated side of the substrate. Alternately, the in-line calendering is "steel-on steel" (SOS), meaning both opposing rolls are steel. The process may also employ one or more nip stations each having generally non-compliant rolls. After in-line calendering, the substrate or other material is wound.

The process then optionally proceeds to an off-line portion. This off-line portion may be at a stand-alone machine in the same facility or may be at a second location. The coated substrate is unwound and then calendered. The off-line calendering includes passing the coated substrate through a series of generally non-compliant rollers, e.g. multiple steel rollers, although materials other than steel may be used. The coated, calendered substrate then is wound a second time. After calendering, the magnetic medium is slit into the desired width and wound into rolls for subsequent processing into finished product.

Although specific embodiments have been described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

EXAMPLES

Magnetic recording media were made using the process of the invention and compared again otherwise identical control media. The specific media, and certain properties such as squareness and orientation ratio, are shown in Table 1. As can be seen in Table 2, a dramatic increase in skirt SNR was seen in the magnetic recording media made according to the invention, i.e., exposed to the added first magnetic field.

TABLE 1

| Media ID | Hc (Oe) | Squareness | Orientation Ratio |
| --- | --- | --- | --- |
| 8517 Control | 1828 | 0.827 | 2.18 |
| 8517 | 1832 | 0.834 | 2.25 |
| 8528 Control | 1820 | 0.825 | 2.15 |
| 8528 | 1820 | 0.833 | 2.21 |

TABLE 2

| Media ID | BBSN Relative dB | SNR skirt Relative dB | HF Amplitude % of ref. | Resolution % of ref. |
| --- | --- | --- | --- | --- |
| 8517 Control | −0.35 | −1.70 | 101 | 100 |
| 8517 | −0.29 | −0.72 | 103 | 99 |
| 8528 Control | −0.48 | −1.55 | 98 | 99 |
| 8528 | −0.21 | −0.24 | 102 | 100 |

What is claimed is:

1. A method of manufacturing a magnetic recording medium comprising the steps of:
    a) forming at least one support layer on at least a first major surface of non-magnetic substrate;
    b) forming at least one magnetic layer comprising magnetic pigment particles atop said at least one support layer to form a magnetic recording medium having multiple layers;
    c) exposing said magnetic recording medium to a first magnetic field of up to about 2500 gauss when the average percent solids of said multiple layers is less than about 40% collectively, and
    d) exposing said magnetic recording medium to at least one additional magnetic field of from about 3500 to about 7000 gauss when the average percent solids of said multiple layers is from about 43% to about 60% collectively,
wherein said magnetic pigment particles in said magnetic layer are oriented in a longitudinal direction.

2. The manufacturing method of claim 1, wherein said magnetic pigment particles are oriented at a point when said average percent solids of said multiple layers collectively is less than about 37%.

3. The manufacturing method of claim 1, wherein the magnetic recording medium is exposed to said first magnetic field at a point when said average percent solids of said multiple layers collectively is from about 33% to about 37%.

4. The manufacturing method of claim 1, wherein the magnetic recording medium is exposed to said second magnetic field at a point when said average percent solids of said layers collectively is from about 43% to about 60%.

5. The manufacturing method of claim 4, wherein the magnetic recording medium is exposed to said second magnetic field at a point when said average percent solids of said layers collectively is from about 45% to about 50%.

6. The manufacturing method of claim 1, wherein said magnetic recording medium is exposed to said first magnetic field subsequent to entering a drying oven.

7. The manufacturing method of claim 6, wherein said magnetic recording medium is exposed to said first magnetic field prior to entering a drying oven.

8. The manufacturing method of claim 7, wherein said magnetic recording medium is exposed to said second magnetic field subsequent to entering a drying oven.

9. The manufacturing method of claim 6, wherein said magnetic recording medium is exposed to said second magnetic field subsequent to entering a drying oven.

10. The manufacturing method of claim 1, further comprising the step of coating at least one layer on said second major surface of said substrate.

* * * * *